United States Patent
Perotto

[19]

[11] Patent Number: 6,095,560
[45] Date of Patent: Aug. 1, 2000

[54] ADAPTIVE PYROTECHNIC GAS GENERATOR FOR AIRBAG, WITH NEUTRALIZING DEVICE

[75] Inventor: Christian Perotto, Ballancourt, France

[73] Assignee: Livbag SNC, Vert le Petit, France

[21] Appl. No.: 09/151,729

[22] Filed: Sep. 11, 1998

[30] Foreign Application Priority Data

Sep. 12, 1997 [FR] France ................................. 97 11352

[51] Int. Cl.[7] .................................................. B60R 21/26
[52] U.S. Cl. ...................................................... 280/741
[58] Field of Search ............................................. 280/741

[56] References Cited

U.S. PATENT DOCUMENTS

| | | | |
|---|---|---|---|
| 4,998,751 | 3/1991 | Paxton et al. | 280/741 |
| 5,022,674 | 6/1991 | Frantom et al. | 280/741 |
| 5,219,178 | 6/1993 | Kobari et al. | 280/741 |
| 5,564,743 | 10/1996 | Marchant | 280/741 |
| 5,664,802 | 9/1997 | Harris et al. | 280/741 |

*Primary Examiner*—Kenneth R. Rice
*Attorney, Agent, or Firm*—Pillsbury Madison & Sutro LLP

[57] ABSTRACT

The generator (1) comprises a hollow cylindrical body (2) comprising a side wall (3) in which is crimped an impervious transverse partition (4) which separates an upstream combustion chamber (5) from a downstream combustion chamber (6), each combustion chamber (5, 6) having a pyrotechnic charge (7, 8). A neutralizing device consists, on the one hand, of a delay tube (21) fixed into the impervious transverse partition (4) and, on the other hand, of a pyrotechnic mixture (24) contained in the said delay tube (21). A safety assembly (31) is fitted around the necked region (28) and has pre-cut regions covering the combustion gases ejection nozzles.

This adaptive pyrotechnic gas generator is intended to inflate an airbag and guarantees that any pyrotechnic substance is eliminated after operation.

10 Claims, 3 Drawing Sheets

ADAPTIVE PYROTECHNIC GAS GENERATOR FOR AIRBAG, WITH NEUTRALIZING DEVICE

The invention relates to the field of automotive safety and deals more specifically with adaptive pyrotechnic gas generators for inflating airbags.

New so-called "adaptive" generators have appeared recently with a view to limiting the risks of bodily injury caused by the deployment of the airbag under exceptional conditions. These generators, associated with appropriate detection systems, make it possible to limit the volume of gas generated or to alter the gas flow rate as a result of various parameters such as, for example, ambient temperature, the nature and intensity of the impact, the morphology and position of the passenger. These generators generally comprise two combustion chambers separated by an impervious wall, each chamber containing a pyrotechnic charge and an electric ignition system. Thus, depending on the circumstances of the accident, it is possible either to initiate both electric ignition systems simultaneously or in turn in order to inflate the airbag completely, a staggered firing making it possible to alter the rate of inflation of the bag, or to initiate just one electric ignition system and therefore release just a limited volume of gas. In the latter case, there is still one unused pyrotechnic charge inside the generator once the airbag has been deployed. Now, it would be desirable, for safety reasons, to secure the complete disappearance of any pyrotechnic charge at the end of operation of the adaptive generator, only non-activation of one of the two electric ignition systems being tolerated.

Hitherto, a known way of initiating the unused pyrotechnic charge is the one based on the passage, from one combustion chamber to the other, of a small amount of the combustion gases from the pyrotechnic charge that is being used, via leaks created deliberately in the dividing wall between the two chambers. However, the reliability and control of such a system has not actually been mastered.

Some patents, such as U.S. Pat. No. 4,998,751, for example, describe generators that comprise two distinct pyrotechnic charges separated by an impervious wall and fired by an ignition tube which extends on each side of the said impervious wall. However, these generators, which actually do leave no live pyrotechnic substance once they have operated, are not "adaptive". Indeed, these generators could rather be qualified as "progressive generators" because they offer just one mode of operation which is that of altering the rate of inflation of the airbag, and of doing so without taking the circumstances of the accident into account.

Those skilled in the art are therefore looking for a reliable adaptive pyrotechnic gas generator which, without adversely affecting the possibilities of operation offered by and the performance expected of such an adaptive generator will ensure, after operation, that all live pyrotechnic substance inside the said generator is eliminated.

The invention therefore sets out to meet this need, and relates to an adaptive pyrotechnic gas generator intended to inflate an airbag that can be used in automotive safety, comprising a body containing at least two combustion chambers separated from one another by an impervious partition, each of these two combustion chambers having at least one pyrotechnic charge, an independent ignition system and being equipped with gas-ejection nozzles which are initially closed off, characterized in that the generator comprises a device for neutralizing the pyrotechnic charges of the two combustion chambers following operational inflation of the airbag, this neutralization device comprising a means for providing communication between the two combustion chambers and a means of initiating one of the two pyrotechnic charges, these two means being triggered by the firing of one of the two pyrotechnic charges.

Thus, this adaptive pyrotechnic gas generator allows the passenger to be protected effectively in the event of an accident while at the same time ensuring that the two pyrotechnic charges are eliminated.

What happens is:

When the bag has to be fully inflated in a time of the order of 50 milliseconds, which constitutes a normal duration of operation of a generator, the two ignition systems are initiated simultaneously or in turn and cause the firing of the two pyrotechnic charges. It then follows that the device for neutralizing the pyrotechnic charges has no effect in this configuration.

When effective protection of the passenger requires only partial inflation of the airbag, within the same length of time, just one of the two ignition systems, chosen at will, is ignited. The pyrotechnic charge associated with it is then fired and both generates combustion gases which inflate the airbag in the desired time, and trigger the device for neutralizing the pyrotechnic charges. Thus, at the end of at least 50 milliseconds, the communication means and the means of initiating the said device bring about the firing of the unused pyrotechnic charge contained in the second combustion chamber. The gases generated then escape, on the one hand, through the nozzles housed in the second combustion chamber, and on the other hand, by means of the fact that the two combustion chambers are in communication, and finally through the nozzles housed in the first combustion chamber. Because of the increase in the number of nozzles through which the gases generated by the unused pyrotechnic charge can escape, the pressure within the generator is relatively low and this lengthens the duration of combustion of the said unused pyrotechnic charge. This thus gives the generator a low mass flow rate for the combustion gases generated by the unused pyrotechnic charge, and therefore ensures unaggressive behaviour.

As a preference, the communication means consists of at least one delay tube which has two closed ends and which is fixed into the impervious partition in such a way that each of the two combustion chambers contains one of these two ends, and the initiation means consists of a pyrotechnic mixture contained in the delay tube, the duration of combustion of the said pyrotechnic mixture when the delay tube is initiated by just one of its two ends being greater than the time needed for operational inflation of the airbag.

As a preference, the pyrotechnic mixture comprises a relay pyrotechnic composition consisting essentially of an oxidation-reduction mixture. Advantageously, the oxidizing charge may, for example, consist of potassium perchlorate or potassium nitrate, or copper oxide or lead chromate, and the reducing charge may, in particular, consist of aluminium, or boron, or zirconium, or alternatively titanium. Advantageously, the combustion of the pyrotechnic mixture essentially generates only gaseous products and ash. As a preference, the duration of combustion of the pyrotechnic mixture is at least equal to a reference duration close to 50 milliseconds. Advantageously, each of the two ends of the delay tube is closed off by a blow-out disc.

According to a preferred embodiment of the invention,
i) the body has a side wall in which the said impervious partition is fixed,
ii) a safety assembly is fitted around part of the side wall of the body and prevents the gases generated by the combustion of the pyrotechnic charge contained in one of the two combustion chambers from entering the other combustion chamber via the nozzles and igniting the pyrotechnic charge it contains, iii) a casing, consisting of a cover and a cap, secured to one another, is fixed into the side wall of the body and forms a diffusion chamber around the said side wall, iv) the casing comprises vents for discharging the combustion gases.

As a preference, the pyrotechnic charge consists either of a pyrotechnic composition chosen from the group of so-called "double base" compositions, that is to say compositions based on nitrocellulose and on nitroglycerine, or of a composite pyrotechnic composition based on an organic binder and on at least one oxidizing filler.

According to a first feature of this preferred embodiment of the invention, the safety assembly consists of an annular metal strip, the ends of which are joined, and which has pre-cut regions. Advantageously, the safety assembly is fitted around the side wall of the body in such a way that the nozzles are each covered by one of the pre-cut regions.

Also as a preference, the side wall of the body has an external peripheral necked region lying between two shoulders, this necked region acting as a housing for the safety assembly and containing the said nozzles. Thus, this assembly is wedged between two shoulders and cannot, even in a violent impact, come out of its housing.

According to another feature of this preferred embodiment of the invention, in each combustion chamber, the pyrotechnic charge is isolated from the body and from the impervious partition by a cylindrical wrapper. Thus, the cylindrical wrapper protects the pyrotechnic charge from the ambient moisture and from prolonged contact with the side wall of the body or with the impervious partition. Advantageously, the cylindrical wrapper has a side wall pressed against the internal surface of the side wall of the said body. The nozzles borne by the latter side wall are then closed off by the side wall of the cylindrical wrapper, which acts as blow-out discs.

A generator according to the invention therefore presents the following two advantages:

On the one hand, manufacturing employs just a small number of parts, the assembly of which can be readily automated, this allowing a very appreciable reduction in manufacturing costs.

On the other hand, this generator offers the possibility of varying the volume of gas generated or the rate of inflation of the airbag, while at the same time guaranteeing that all unused live pyrotechnic substance will be eliminated after operation.

A detailed description of the preferred embodiment is given below with reference to FIGS. 1 to 5.

Figure 1:
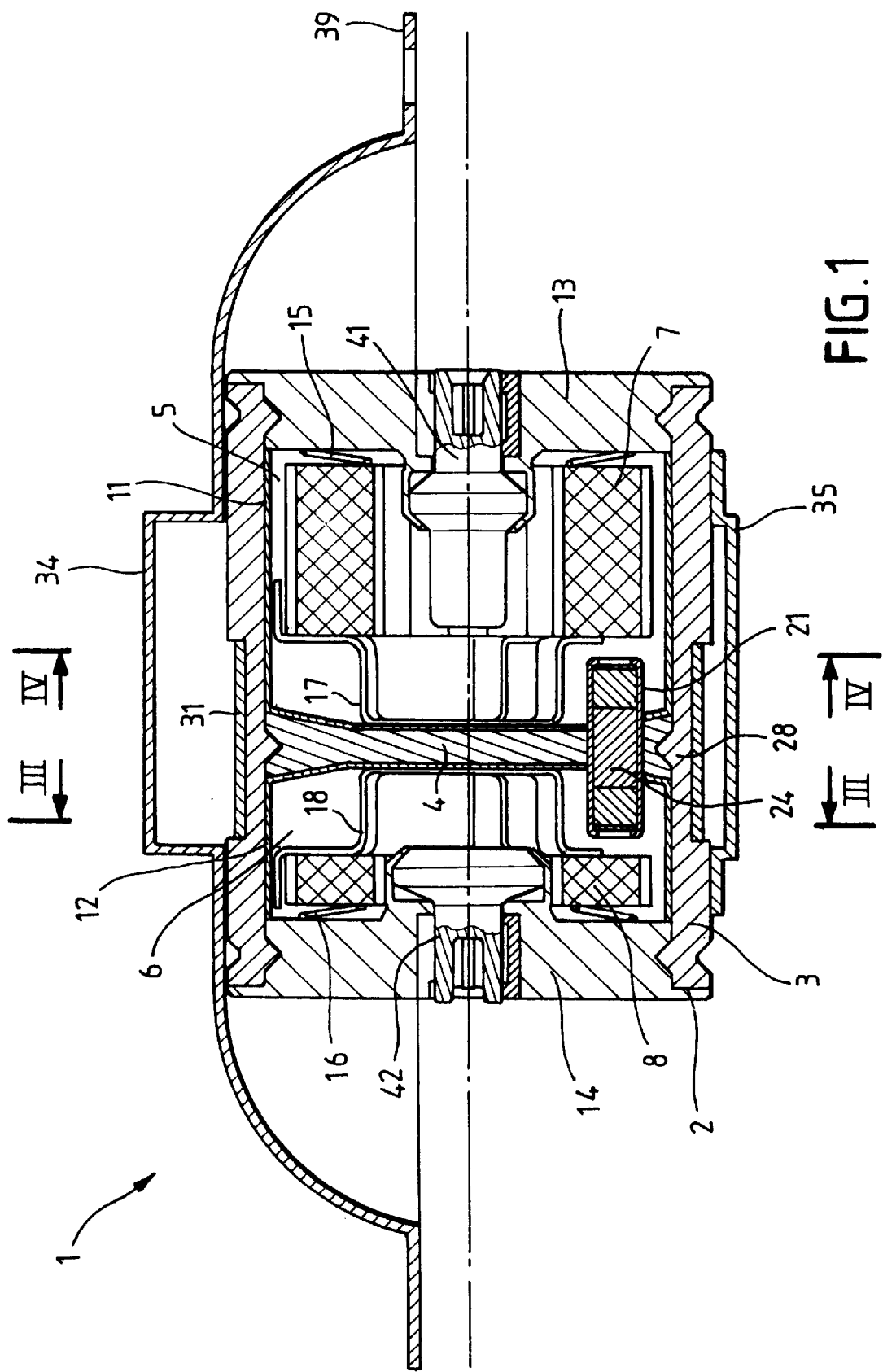
FIG. 1 is a view in longitudinal section of a generator according to the invention.
Figure 2:
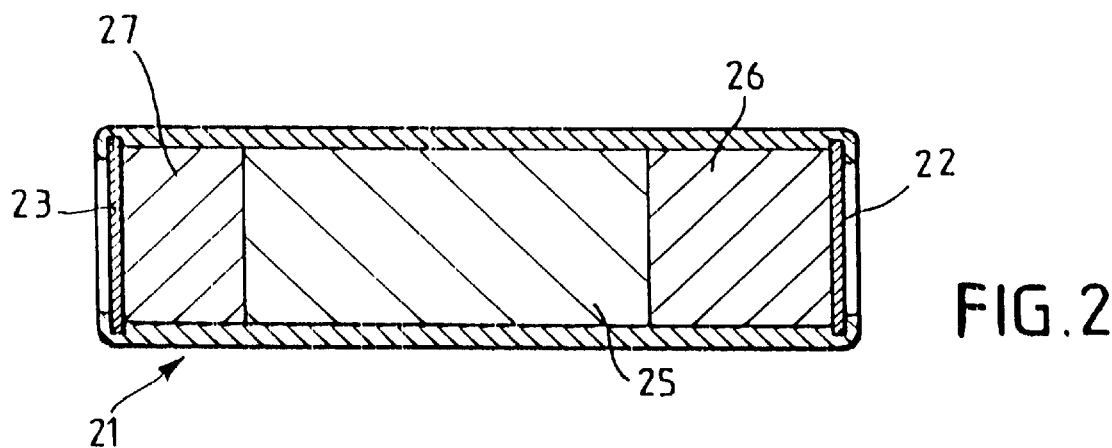
FIG. 2 is a view in longitudinal section of the delay tube of the generator depicted in FIG. 1.
Figure 3:
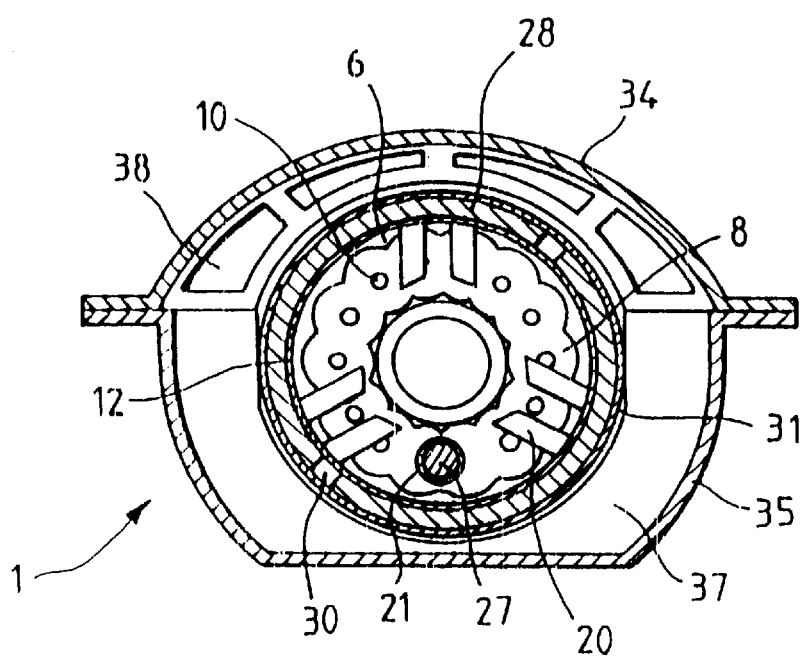
FIG. 3 is a section on III—III of the generator depicted in FIG. 1.
Figure 4:
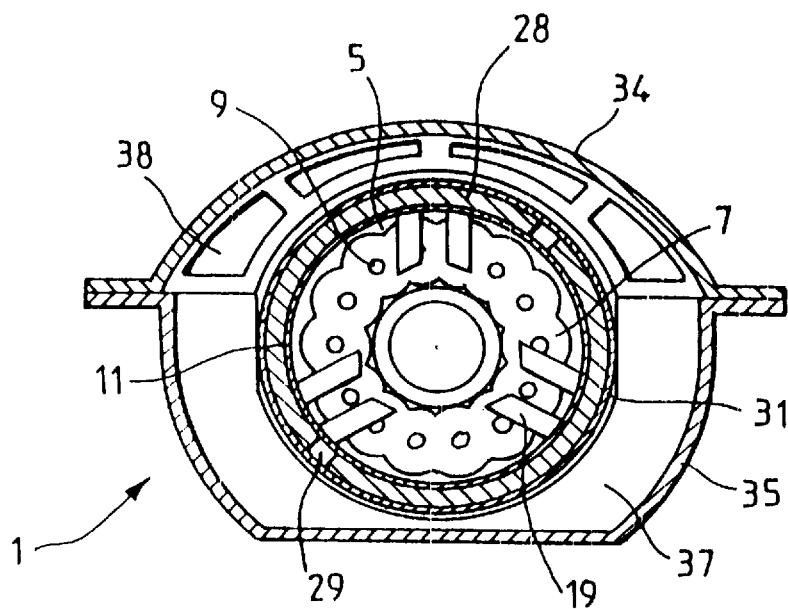
FIG. 4 is a section on IV—IV of the generator depicted in FIG. 1.

Referring to FIGS. 1 to 4, it can be seen that an adaptive pyrotechnic gas generator 1 according to the invention comprises a one-piece cylindrical body 2 which has a side wall 3 with two open ends. A transverse impervious partition 4 is crimped into the side wall 3 and divides the said body 2 into an upstream combustion chamber 5 and a downstream combustion chamber 6.

The upstream combustion chamber 5 contains a cylindrical block of pyrotechnic charge 7 perforated by a number of ducts 9 which are parallel to the axis of the block, this being parallel to the generatrices of the body 2. The block of pyrotechnic charge 7 is isolated from the side wall 3 and from the impervious transverse partition 4 by a thin metal cylindrical wrapper 11. The latter has a closed end resting against the impervious transverse partition 4, a side wall pressed against the internal surface of the side wall 3 of the body 2 and a free end bonded hermetically to a closure ring 13 crimped into the open end of the side wall 3. The said closed end of the cylindrical wrapper 11 also has an orifice, the role of which will be explained later. An electric igniter 41, the connector of which is protected by a shunt, is inserted in the closure ring 13. The block of pyrotechnic charge 7 is held in with the aid of a helical spring 15 and a retaining ring 17. The spring 15 rests both against the closure ring 13 and against one end of the said block. The other end of the block abuts against the retaining ring 17 and is itself partially bonded to the closed end of the cylindrical wrapper 11. Advantageously, the retaining ring 17 has the shape of a cylindrical cup, the open end of which has tabs 19 which grip the block of pyrotechnic charge 7.

In exactly the same way, the downstream combustion chamber 6 contains a block of pyrotechnic charge 8 perforated with a number of ducts 10. As a preference, the block housed in the downstream combustion chamber 6 is smaller than the one housed in the upstream combustion chamber 5. The block of pyrotechnic charge 8 is also isolated from the side wall 3 and from the impervious transverse partition 4 by a cylindrical wrapper 12, the free end of which is bonded hermetically to a closure ring 14 in which an electric igniter 42 is inserted, the said closure ring 14 being crimped into the open end of the side wall 3. The block of pyrotechnic charge 8 is held in, in the same way, with the aid of a helical spring 16 and of a retaining ring 18, the said retaining ring 18 advantageously being in the shape of a cylindrical cup, the open end of which has tabs 20 which grip the block of pyrotechnic charge 8.

A delay tube 21 which, on the one hand, passes through each of the two cylindrical wrappers 11, 12 via the orifice it has at its closed end, and which, on the other hand, is fixed, for example, by welding into a hole made in the impervious transverse partition 4, has an axis of revolution which is parallel to but offset from the axis of the body 2. This delay tube 21 has a first end and a second end which are housed respectively in the upstream combustion chamber 5 and in the downstream combustion chamber 6, each end being closed off by a blow-out disc 22, 23. The delay tube 21 contains a pyrotechnic mixture 24 comprising a relay pyrotechnic composition 25 inserted between two pyrotechnic compositions 26, 27 of the same type as is used for the two blocks of pyrotechnic charge 7, 8. The relay pyrotechnic composition 25 consists of a mixture of zirconium and lead chromate so that the rate of combustion of the said relay pyrotechnic composition inside the delay tube 21 will, for example, be of the order of 50 milliseconds.

The side wall 3 has an external peripheral necked region 28 of constant width which extends on each side of the impervious transverse partition 4. In each combustion chamber 5, 6, the necked region 28 contains nozzles 29, 30 which are initially closed off by the side wall of the corresponding cylindrical wrapper 11 or 12.

Figure 5:
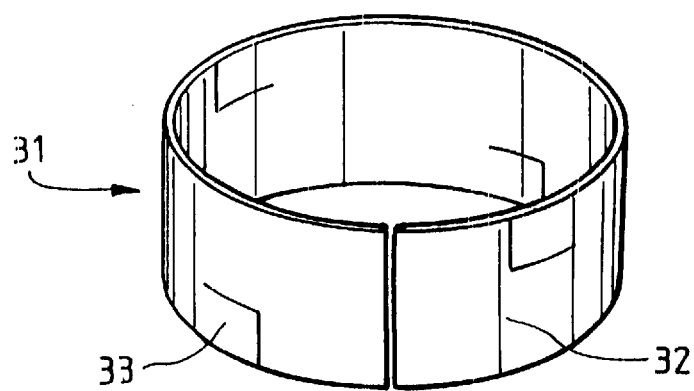
FIG. 5 is a view in perspective of the safety assembly of the generator according to the invention.

Referring to FIGS. 1 and 3 to 5, it can be seen that a safety assembly 31 consists of an annular metal strip 32, the ends of which are joined, and which has pre-cut regions 33. This strip 32 is fitted around the necked region 28 of the side wall 3 in such a way that the nozzles 29 situated in the upstream combustion chamber 5 and the nozzles 30 situated in the downstream combustion chamber 6 are each covered by one of the pre-cut regions 33. A cover 34 and a cap 35, which are fixed, for example, by bonding to the un-necked regions of the external surface of the side wall 3 of the body 2, are secured together in an impervious way by a jointing plane which is parallel to the axis of the body 2, and form a diffusion chamber 37 around the necked region 28. The cover 34 has vents 38 for discharging the combustion gases and has a rim 39 which is parallel to the jointing plane and to which an airbag, not depicted in the figures, is riveted.

A generator 1 of this kind, coupled with a multi-function electronic control unit, allows the following modes of operation. Depending on the circumstances of the accident, the electronic control unit is configured to trigger just one of the two igniters 41, 42, of its choice, or alternatively, if necessary, to trigger both igniters 41, 42 simultaneously or in turn.

In the first case, the igniter chosen is the one whose associated pyrotechnic charge will generate the volume of gas best suited to the situation. By way of example, if the igniter 41 in the upstream combustion chamber 5 is activated, the combustion gases generated will come into contact with the block of pyrotechnic charge 7, thus causing ignition of the said block. When the pressure reaches the blow-out value of the blow-out disc 22 closing off that end of the delay tube 21 that is situated in the upstream combustion chamber 5, the pyrotechnic mixture 24 is ignited and, after approximately 50 milliseconds, the pyrotechnic mixture 24 will, after blowing out the blow-out disc 23, initiate the unused block of pyrotechnic charge 8 housed in the downstream combustion chamber 6. In parallel with that, and before the pyrotechnic mixture causes ignition of the unused pyrotechnic charge 8, the gases generated by the combustion of the block of pyrotechnic charge 7 will rupture the cylindrical wrapper 11 close to the nozzles 29 and therefore exert pressure on the pre-cut regions 33 which cover the said nozzles 29, and this will cause these regions to bend in the direction of the flow of gas. These gases will then enter the diffusion chamber 37 which surrounds the necked region 28 and finally escape through the vents 38 for discharging the combustion gases and inflate the airbag. The annular metal strip 32, some of the pre-cut regions of which cover the nozzles 30, therefore makes it possible to prevent the hot gases generated by the block of pyrotechnic charge 7 from bursting the cylindrical wrapper 12 of the downstream combustion chamber 6 near the nozzles 30 and therefore from causing ignition of the unused pyrotechnic charge 8. Following partial inflation of the airbag which provides protection tailored to the severity of the accident, the block of pyrotechnic charge 8, which is initiated using the delay tube 21, burns and generates combustion gases which escape, on the one hand, via the nozzles 30 from the downstream combustion chamber 6 when, under the effect of an increase in pressure in the combustion chamber 6, the cylindrical wrapper 12 bursts near the said nozzles 30 and the pre-cut regions 33 covering them bend in the direction of the flow of gas, and, on the other hand, via the delay tube 21 which is then empty, and finally via the nozzles 29 of the upstream combustion chamber 5. These gases then enter the diffusion chamber 37 in order, finally, to escape through the vents 38 and come out into the airbag in an unaggressive way. Operation is similar when the electronic control unit triggers the igniter 42 housed in the downstream combustion chamber 6 instead of the igniter 41 housed in the upstream combustion chamber 5.

In the second case, that is to say in the case where the airbag is to be fully inflated in order to provide effective protection, each pyrotechnic charge 7, 8 is initiated by the igniter 41, 42 associated with it. The delay tube 21 is then ignited from both ends and the gases generated by the combustion of the pyrotechnic mixture 24 represent merely an almost negligible proportion of all the gases escaping from the generator 1 following the bursting of the two cylindrical wrappers 11, 12 near the nozzles 29, 30 and the folding of all the pre-cut regions 33. All of the gases therefore pass through the combustion gases discharge vents 38 in order finally to inflate the airbag.

I claim:

1. Adaptive pyrotechnic gas generator (1) intended to inflate an airbag that can be used in automotive safety, comprising a body (2) containing at least two combustion chambers (5, 6) separated from one another by an impervious partition (4), each of these two combustion chambers (5, 6) having at least one pyrotechnic charge (7, 8), an independent ignition system (41, 42) and being equipped with gas-ejection nozzles (29, 30) which are initially closed off, characterized in that the generator (1) comprises a device for neutralizing the pyrotechnic charges (7, 8) of these two combustion chambers (5, 6) following operational inflation of the airbag, this neutralization device comprising a means for providing communication between the two combustion chambers (5, 6) and a means of initiating one of the two pyrotechnic charges (7, 8), these two means being triggered by the firing of one of the two pyrotechnic charges (7, 8).

2. Generator according to claim 1, characterized in that the communication means consists of at least one delay tube (21) which has two closed ends and which is fixed into the impervious partition (4) in such a way that each of the two combustion chambers (5, 6) contains one of its two ends, and in that the initiation means consists of a pyrotechnic mixture (24) contained in the delay tube (21), the duration of combustion of the said pyrotechnic mixture (24) when the delay tube (21) is initiated by just one of its two ends being greater than the time needed for operational inflation of the airbag.

3. Generator according to claim 2, characterized in that the pyrotechnic mixture (24) comprises a relay pyrotechnic composition (25) consisting essentially of an oxidation-reduction mixture.

4. Generator according to either one of claims 2 or 3, characterized in that the pyrotechnic mixture (24) essentially generates only gaseous products and ash.

5. Generator according to any one of claim 2, characterized in that the duration of combustion of the pyrotechnic mixture (24) is at least equal to a reference duration close to 50 milliseconds.

6. Generator according to claim 2, characterized in that each end of the delay tube (21) is closed off by a blow-out disc (22, 23).

7. Generator according to claim 2, characterized in that:
   i) the body (2) has a side wall (3) in which the said impervious partition (4) is fixed,
   ii) a safety assembly (31) is fitted around part of the side wall (3) of the body (2) and prevents the gases generated by the combustion of the pyrotechnic charge contained in one of the two combustion chambers from entering the other combustion chamber via the nozzles and igniting the pyrotechnic charge it contains,
   iii) a casing, consisting of a cover (34) and a cap (35), secured to one another, is fixed into the side wall (3) of the body (2) and forms a diffusion chamber (37) around the said side wall (3), iv) the casing comprises vents (38) for discharging the combustion gases.

8. Generator according to claim 7, characterized in that the safety assembly (31) consists of an annular metal strip (32), the ends of which are joined, and which has pre-cut regions (33).

9. Generator according to claim 8, characterized in that the safety assembly (31) is fitted around the side wall (3) of the body (2) in such a way that the nozzles (29, 30) are each covered by one of the pre-cut regions (33).

10. Generator according to either one of claims 8 or 9, characterized in that the side wall (3) has an external peripheral necked region (28) lying between two shoulders, this necked region (28) acting as a housing for the safety assembly (31) and containing the nozzles (29, 30).

* * * * *